United States Patent [19]

Terado et al.

[11] Patent Number: 5,191,927
[45] Date of Patent: Mar. 9, 1993

[54] METHOD AND APPARATUS FOR DETECTING A SHEET THICKNESS IN A CONTINUOUS CASTING MACHINE

[75] Inventors: Sadamu Terado; Hidenori Hattori, both of Hiroshima; Yoshio Morimoto; Yasuhiro Yamakami, both of Futtsu, all of Japan

[73] Assignees: Mitsubishi Jukogyo Kabushiki Kaisha; Nippon Steel Corporation, both of Tokyo, Japan

[21] Appl. No.: 796,327

[22] Filed: Nov. 22, 1991

[30] Foreign Application Priority Data

Nov. 22, 1990 [JP] Japan ................................. 2-315826

[51] Int. Cl.[5] ........................ B22D 11/06; B22D 11/16
[52] U.S. Cl. ................................... 164/452; 164/480; 164/428; 164/154
[58] Field of Search ............... 164/451, 452, 480, 428, 164/150, 154

[56] References Cited

FOREIGN PATENT DOCUMENTS 1-166863  6/1989  Japan ................................. 164/452

*Primary Examiner*—Kuang Y. Lin
*Attorney, Agent, or Firm*—Wenderoth, Lind & Ponack

[57] ABSTRACT

In a twin-drum type continuous casting machine including a pair of drums having rotary shafts supported in parallel to each other from a pair of frames via chocks and rotating in the opposite directions to each other with a gap space held therebetween, and a depressing device for the drums, a method for detecting a sheet thickness of a thin sheet being cast is improved so that detection of a sheet thickness can be carried out reliably at a high precision without delay. A gap space distance between the drums is calculated by detecting a depressed position from the depressing device. A correction value for the gap space distance is calculated from a deflection of the frame by detecting a depressing force of the depressing device. A correction value for the gap space distance is also calculated from a thermal deformation of the frame by detecting a temperature of frame coolant water of the frame. A correction value for the gap space distance is further calculated from a thermal deformation of the drums by detecting a temperature of drum coolant water of the drums. The calculated gap space distance is corrected with the respective calculated correction values. Thereby the sheet thickness of the thin sheet being cast can be detected precisely. An apparatus favorably available for practicing the above-mentioned method for detecting a sheet thickness of a thin sheet being cast, is also disclosed.

3 Claims, 3 Drawing Sheets

METHOD AND APPARATUS FOR DETECTING A SHEET THICKNESS IN A CONTINUOUS CASTING MACHINE

BACKGROUND OF THE INVENTION

1. of the Invention

The present invention relates to a method and an apparatus for detecting a sheet thickness in a continuous casting machine, in which a cast piece is continuously cast between a pair of drums.

2. Description of the Prior Art

At first, the prior art will be described with reference to FIG. 3.

In a twin-drum type continuous casting machine, molten metal 3 such as molten steel fed from a tundish 2 is poured into a gap space between a pair of rotating water-cooled drums 1, and after having been cooled, a casting piece 4 is continuously cast. The casting piece 4 is delivered by means of pinch rolls 5 and wound into a coil 6. Reference numeral 7 designates a sheet thickness detector which detects a sheet thickness of the casting piece 4, and the detection signal is used as a feedback signal in a sheet thickness control system. More particularly, while a molten metal level in the tundish is kept constant, a rotational speed of the drum is corrected in accordance with a deviation of the above-described detected value from a target value of the sheet thickness of the casting piece. Practically, the sheet thickness is controlled to have a predetermined sheet thickness by increasing the rotational speed in the event that the really measured sheet thickness is thicker than the target sheet thickness but decreasing the rotational speed in the event that the former is thinner than the latter.

However, the above-described sheet thickness detector in a twin-drum type continuous casting machine in the prior art involved the following problems because of the fact that it was installed behind the drums and it was used for detecting a sheet thickness of a casting piece at a high temperature:

(a) In the case where the drums have been opened due to any troubles during casting, there is a possibility that the sheet thickness detector may be covered by molten metal.

(b) Because of the above-mentioned reason, employment of a sheet thickness detector of radiation type is difficult.

(c) Also, even with respect to sheet thickness detectors of the other types (for instance, a sheet thickness detector of differential transformer type, pneumatic micrometer type, laser type or the like), in the event that they have been covered by molten metal, there is a possibility that they may be damaged.

(d) In the case where the detector is installed behind so as not to be subjected to damage by molten metal if possible, delay in detection becomes large, and a controllability for the sheet thickness becomes poor.

SUMMARY OF THE INVENTION

It is therefore one object of the present invention to provide an improved method for detecting a sheet thickness in a continuous casting machine, which can detect a sheet thickness of a thin sheet being cast reliably at a high precision without delay.

Another object of the present invention is to provide a novel apparatus which can be favorably used for practicing the above-mentioned improved method for detecting a sheet thickness in a continuous casting machine.

According to one feature of the present invention, there is provided a method for detecting a sheet thickness in a twin-drum type continuous casting machine including a pair of drums having rotary shafts supported in parallel to each other from a pair of frames via chocks and rotating in the opposite directions to each other with a gap space held therebetween, and a depressing device for the drums, in which machine a thin sheet is cast by pouring molten metal into the gap space between the drums; consisting of the steps of calculating a distance of the gap space by detecting a depressed position from the depressing device, further calculating a correction value for the gap space distance from a deflection of the frame by detecting a depressing force of the depressing device, calculating a correction value for the gap space distance from a thermal deformation of the frame by detecting a temperature of frame coolant water of the frame, calculating a correction value for the gap space distance from a thermal deformation of the drums by detecting a temperature of drum coolant water of the drums, correcting the calculated gap space distance with the respective calculated correction values, and thereby detecting the sheet thickness of the thin sheet, which is being cast.

According to another feature of the present invention, there is provided an apparatus for detecting a sheet thickness in a continuous casting machine, which comprises a pair of frames adapted to be cooled by coolant water, a pair of drums respectively having rotary shafts supported in parallel to each other from the frames via chocks and adapted to be rotated in the opposite directions to each other with a gap space held therebetween and to be cooled by coolant water, a depressing device provided on the frames for depressing the drums, a depressed position detector provided in the depressing device for detecting a depressed position, a depressing force detector provided on the frames for detecting a depressing force of the drums, a frame coolant water temperature detector provided on the frames for detecting a temperature of the frame coolant water, a drum coolant water temperature detector provided on the frames for detecting a drum coolant water temperature of the drums, and a computing unit responsive to the outputs of the depressed position detector, the depressing force detector, the frame coolant water temperature detector, and the drum coolant water temperature detector for calculating a sheet thickness of the sheet, which is being cast.

According to the present invention, owing to the above-mentioned novel features, a gap space distance S between the drums can be calculated on the basis of a detected value fed from a depressed position detector in the depressing device. This gap space distance S is equal to a gap space distance at an ordinary temperature when depression is not effected. A correction value $\Delta h_1$ for the gap space distance due to deflection of the frames at the time of depression is calculated by detecting a depressing force of the depressing device. In addition, a correction value $\Delta h_2$ for the gap space distance due to thermal deformation of the frames at a high temperature is calculated by detecting a temperature of coolant water for the frames. Furthermore, a correction value $\Delta h_3$ for the gap space distance due to thermal deformation of the drums at a high temperature is calculated by detecting a temperature of coolant water for the drums. Then, the above-mentioned gap space distance S is corrected with the aforementioned respective correction values $\Delta h_1$, $\Delta h_2$ and $\Delta h_3$, and thereby a detected thickness value of the sheet being cast is obtained.

In the above-described manner, a thickness of a sheet being cast can be detected precisely at the drum section without necessitating to install the sheet thickness detecting apparatus on the downstream side of the drums. Accordingly, if sheet thickness control is effected by making use of this detected thickness value, then highly excellent sheet thickness control can be carried out without delay in detection time. Also, since there is no risk of damage caused by molten metal, a reliability of the detection of a thickness is high.

The above-mentioned and other objects, features and advantages of the present invention will become more apparent by reference to the following description of one preferred embodiment of the invention taken in conjunction with the accompanying drawings.

BRIEF DESCRIPTION OF THE DRAWINGS

In the accompanying drawings

DESCRIPTION OF THE PREFERRED EMBODIMENT

Now, one preferred embodiment of the present invention will be described with reference to FIGS. 1 and 2.

It is to be noted that the portion of the preferred embodiment already described previously in connection to the prior art will be omitted from further description, and description will be made principally for the portion relating to this invention per se.

Figure 1:
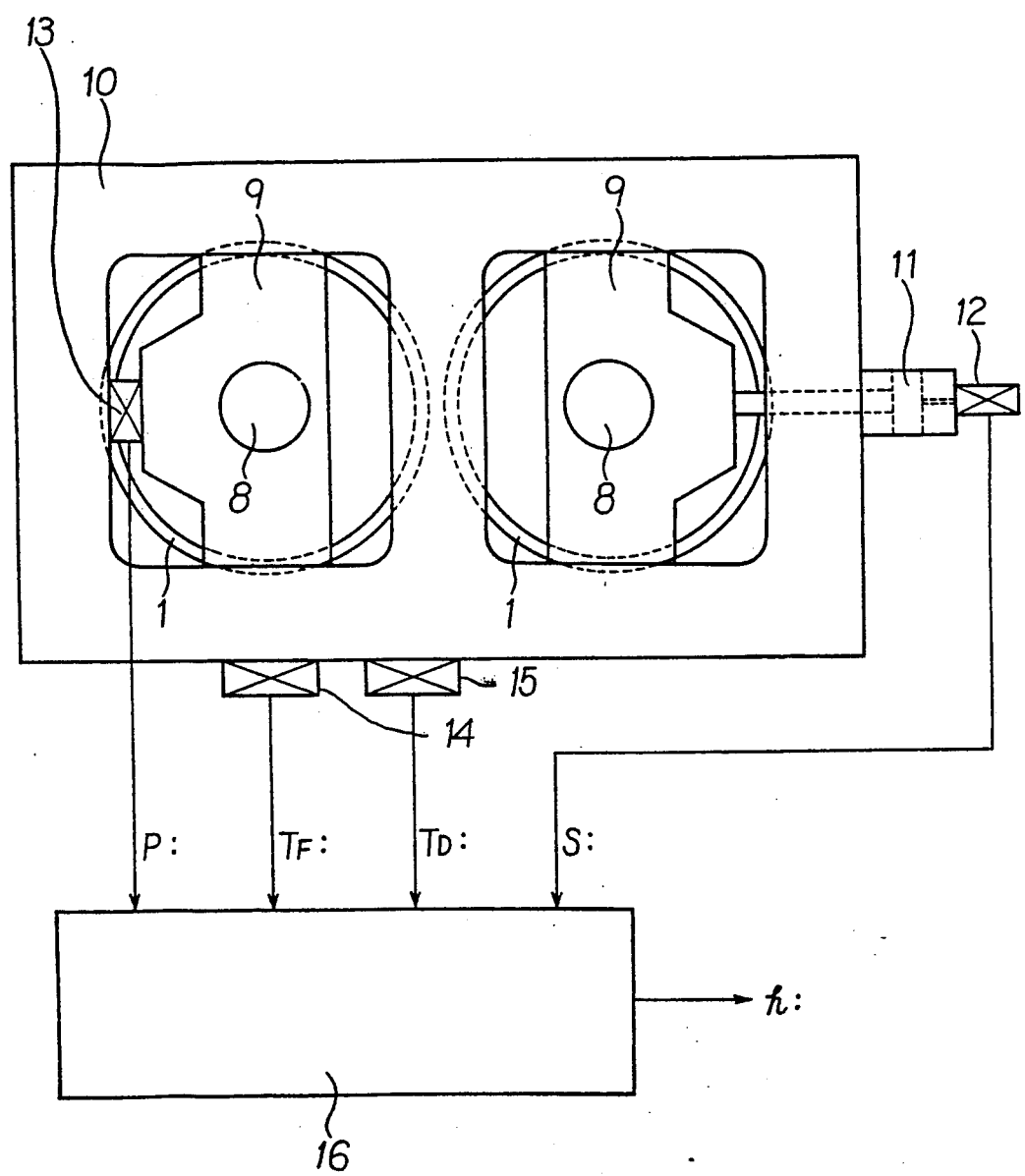
FIG. 1 shows a system diagram of a general construction and a partial side view of one preferred embodiment of the present invention.

FIG. 1 is a side view as seen from a non-drive side, and a side view as seen from a drive side is also similar to this. A pair of frames 10 are present on the left and on the right. Chocks 9 are mounted in a forwardly and backwardly movable manner at the front and rear portions of the frames 10, and they respectively support shafts 8 of a pair of drums 1. The shafts 8 of the drums 1 are disposed in parallel to each other, and they rotate in the opposite directions to each other with a gap space held between the drums 1. At the front portions of the frames 10 is provided a depressing force detector 13 butting against the same frame 10 and the front end surface of the front chock 9. In addition, at the rear portions of the frames 10 is provided a depressing device 11 for depressing the rear end surface of the rear chock 9 forwards. Furthermore, in the depressing device 11 is provided a depressed position detector 12.

In the frames 10 is present a coolant water circulating device (omitted from illustration) for cooling the frames, and at its outlet is mounted a frame coolant water temperature detector 14. In addition, in the drums 1 is present a coolant water circulating device (omitted from illustration) for cooling the drums, and at its outlet is mounted a drum coolant water temperature detector 15.

The outputs of the depressing force detector 13, the depressed position detector 12, the frame coolant water temperature detector 14 and the drum coolant water temperature detector 15 are transmitted to a computing unit 16.

Figure 2:
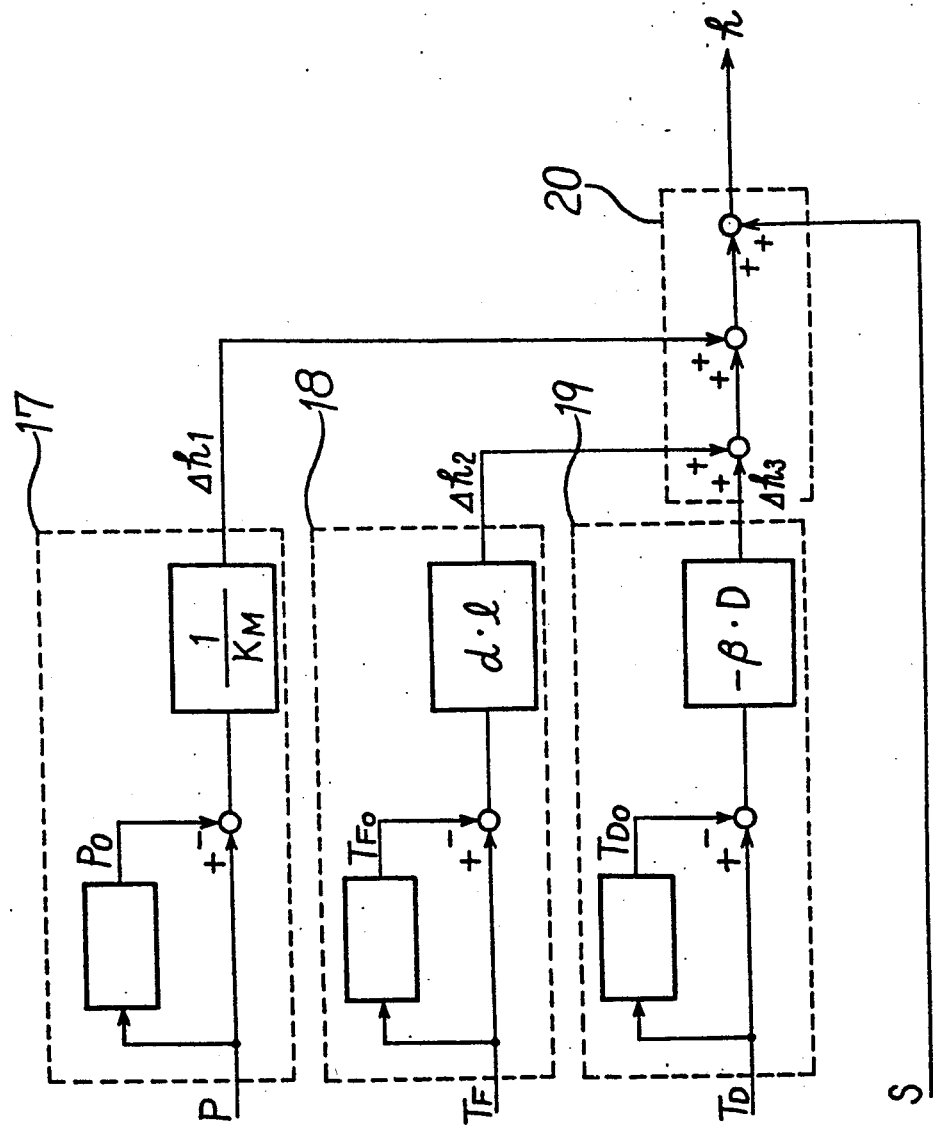
FIG. 2 is a detailed block diagram of an arithmetic unit in the same preferred embodiment.
Figure 3:
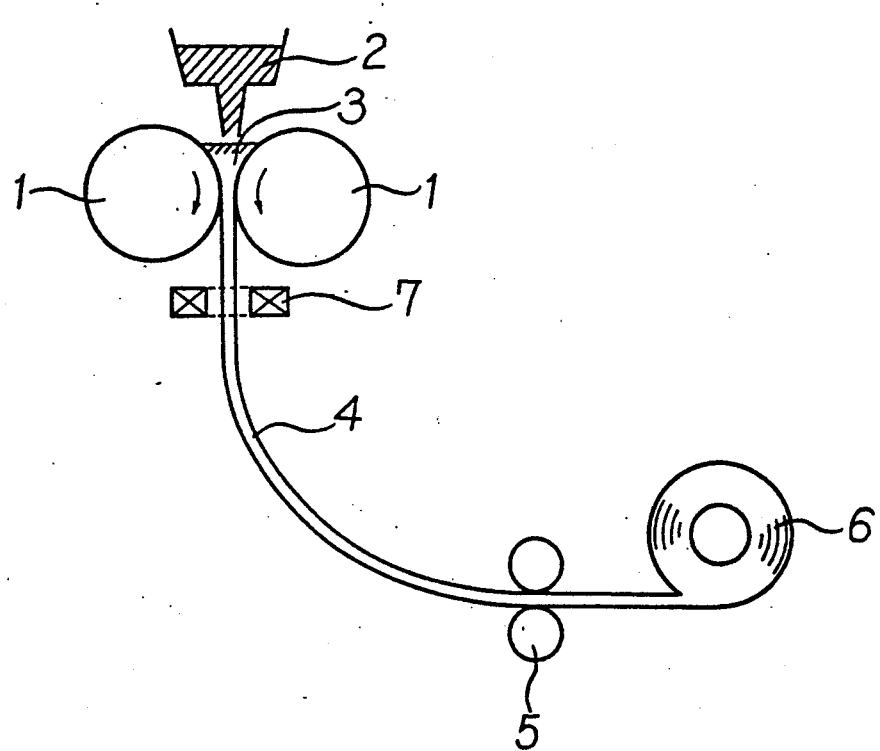
FIG. 3 is a general system diagram showing a construction of a twin-drum type continuous casting machine in the prior art.

Details of the computing unit 16 are shown in FIG. 2.

An output P of the depressing force detector 13 is transmitted via a first correction calculator 17 to a sheet thickness calculator 20. Also, an output $T_F$ of the frame coolant water temperature detector 14 is transmitted via a second correction calculator 18 to the sheet thickness calculator 20. Furthermore, an output $T_D$ of the drum coolant water temperature detector 15 is transmitted via a third correction calculator 19 to the sheet thickness calculator 20. In addition, an output S of the depressed position detector 12 is transmitted to the sheet thickness calculator 20.

In the above-described construction, at first description will be made on an operation principle.

Upon adjustment, the front and rear drums 1 are made to touch each other by manipulating the depressing device 11, they are depressed with a predetermined zero-adjustment depressing force $P_O$, and the depressing device 11 is reset to zero. In addition, a frame coolant water temperature $T_{FO}$ at this time and a drum coolant water temperature $T_{DO}$ at this time are stored in the computing unit 16.

A signal S representing the gap space distance between the drums is obtained from the depressed position detector 12. This gap space distance is equal to the gap space distance at an ordinary temperature when no depression is present.

Next, description will be made on corrections in a real operation.

(a) Correction for the drum gap space distance due to frame deflection

This is a change of the gap space distance between the drums 1 due to deflection produced by the depressing force acting upon the frames 10 and the chocks 9. If a mechanical rigidity of the frames 10 and the like is represented by $K_M$ and the depressing force is represented by P, then the correction value $\Delta h_1$ is represented by Equation-(1).

$$\Delta h_1 = \frac{P - P_O}{K_M} \tag{1}$$

(b) Correction for the drum gap space distance due to frame thermal expansion This is a change of the gap space distance between the drums 1 due to thermal expansion of the frames 10 at the time of casting, and if a length of the frames is represented by l, a coefficient of linear thermal expansion of the frames is denoted by $\alpha$, and a temperature of the frame coolant water is denoted by $T_F$, then the correction value $\Delta h_2$ is represented by Equation-(2).

$$\Delta h_2 = \alpha \cdot l (T_F - T_{FO}) \tag{2}$$

(c) Correction for the drum gap space distance due to drum thermal expansion This is a change of the gap space distance between the drums 1 due to thermal expansion of the water-cooled drums 1 per se, and if a diameter of the drums is represented by D, a coefficient of linear thermal expansion of the drums is represented by $\beta$, and a temperature of the drum coolant water is denoted by $T_D$, then the correction value $\Delta h_3$ is represented by Equation-(3).

$$\Delta h_3 = -\beta \cdot D \cdot (T_D - T_{D0}) \quad (3)$$

Accordingly, if a gap space distance between the drums at an ordinary temperature when no depression is present is represented by S, then a sheet thickness h at the time of casting is represented by Equation (4).

$$h = S + \Delta h_1 + \Delta h_2 + \Delta h_3 \quad (4)$$

On the basis of the above-described operation principle, upon practical operations, the gap space distance S between the drums is obtained from the depressed position detector 12, and it is transmitted to the sheet thickness calculator 20.

The depressing force P is detected in the depressing force detector 13, calculation of Equation-(1) is carried out by the first correction calculator 17, and the result is transmitted to the sheet thickness calculator 20. In addition, the frame coolant water temperature $T_F$ is detected in the frame coolant water temperature detector 14, then calculation of Equation-(2) is carried out by the second correction calculator 18, and the result is transmitted to the sheet thickness calculator 20. Furthermore, the drum coolant water temperature $T_D$ is detected in the drum coolant water temperature detector 9, then calculation of Equation-(3) is carried out by the third correction calculator 19, and the result is transmitted to the sheet thickness calculator 20.

The sheet thickness calculator 20 receives the above-mentioned respective input signals representing S, $\Delta h_1$, $\Delta h_2$ and $\Delta h_3$, and carries out the calculation of Equation-(4) to out put a signal representing a corrected sheet thickness.

In the above-described manner, a sheet thickness can be detected at a high precision in the portion of the drums 1 without necessitating to install a sheet thickness detecting apparatus on the downstream side of the drums 1. Accordingly, if sheet thickness control is effected by making use of this detected thickness value, then sheet thickness control at a high performance can be achieved without delay in detection time. In addition, since there is no risk of damage caused by molten metal, a reliability is also high.

As described in detail above, according to the present invention, since it is possible to detect a sheet thickness of a casting piece without necessitating to install a thickness detector behind the drums, the following advantages are obtained:

(a) Even if the drums should be opened due to any troubles during a casting operation, no damage is applied to the sheet thickness detector, and so, the system is extremely advantageous for practical management.

(b) Since a sheet thickness is detected just under the drums, there is no delay in detection, and hence, the detection signal is most suitable as a feedback signal in an automatic sheet thickness control system.

While a principle of the present invention has been described above in connection to one preferred embodiment of the invention, it is intended that all matter contained in the above description and illustrated in the accompanying drawings shall be interpreted to be illustrative and not in a limiting sense.

What is claimed is:

1. A method for detecting a sheet thickness in a twin-drum type continuous casting machine including a pair of drums having rotary shafts supported in parallel to each other from a pair of frames via chocks and rotating in the opposite directions to each other with a gap space held therebetween, and a depressing device for said drums, in which machine a thin sheet is cast by pouring molten metal into the gap space between said drums; comprising the steps of calculating a distance of said gap space by detecting a depressed position from said depressing device, further calculating a correction value for said gap space distance from a deflection of said frame by detecting a depressing force of said depressing device, calculating a correction value for said gap space distance from a thermal deformation of said frame by detecting a temperature of frame coolant water of said frame, calculating a correction value for said gap space distance from a thermal deformation of said drums by detecting a temperature of drum coolant water of said drums, correcting said calculated gap space distance with said respective calculated correction values, and thereby detecting the sheet thickness of the thin sheet, which is being cast.

2. An apparatus for detecting a sheet thickness in a continuous casting machine; comprising a pair of frames adapted to be cooled by coolant water, a pair of drums respectively having rotary shafts supported in parallel to each other from said frames via chocks and adapted to be rotated in the opposite directions to each other with a gap space held therebetween and to be cooled by coolant water, a depressing device provided on said frames for depressing said drums, a depressed position detector provided in said depressing device for detecting a depressed position, a depressing force detector provided on said frames for detecting a depressing force of said drums, a frame coolant water temperature detector provided on said frames for detecting a temperature of the frame coolant water, a drum coolant water temperature detector provided on said frames for detecting a drum coolant water temperature of said drums, and a computing unit responsive to the outputs of said depressed position detector, said depressing force detector, said frame coolant water temperature detector and said drum coolant water temperature detector for calculating a sheet thickness of the sheet which is being cast.

3. An apparatus for detecting a sheet thickness in a continuous casting machine as claimed in claim 2, wherein the depressing device depresses a chock of one of said drums, the depressed position detector is disposed in said depressing device, and the depressing force detector is disposed between the chock of the other drum which is not provided with a depressing device and the frame.

* * * * *